United States Patent
Koskela et al.

(10) Patent No.: US 9,622,131 B2
(45) Date of Patent: Apr. 11, 2017

(54) HANDOVER OF DIRECT PEER TO PEER COMMUNICATION

(75) Inventors: Timo Kalevi Koskela, Oulu (FI); Sami-Jukka Hakola, Kempele (FI); Matti Juhani Pikkarainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 972 days.

(21) Appl. No.: 13/581,108

(22) PCT Filed: Mar. 5, 2010

(86) PCT No.: PCT/US2010/026417
§ 371 (c)(1),
(2), (4) Date: Oct. 5, 2012

(87) PCT Pub. No.: WO2011/109027
PCT Pub. Date: Sep. 9, 2011

(65) Prior Publication Data
US 2013/0102314 A1    Apr. 25, 2013

(51) Int. Cl.
*H04W 36/16*    (2009.01)
*H04W 36/00*    (2009.01)
(Continued)

(52) U.S. Cl.
CPC ....... *H04W 36/16* (2013.01); *H04W 36/0072* (2013.01); *H04W 76/043* (2013.01); *H04W 84/18* (2013.01)

(58) Field of Classification Search
CPC .................................................. H04W 36/16
(Continued)

(56) References Cited

U.S. PATENT DOCUMENTS

| 2005/0232212 A1* | 10/2005 | Kang et al. ................ 370/338 |
| 2007/0115884 A1* | 5/2007 | Shang .................. H04W 36/30 370/331 |
| 2008/0267131 A1* | 10/2008 | Kangude et al. ............ 370/331 |

FOREIGN PATENT DOCUMENTS

| CN | 1527621 A | 9/2004 |
| CN | 1622677 A | 6/2005 |

(Continued)

OTHER PUBLICATIONS

Sesia et al., "LTE—The UMTS Long Term Evolution: From Theory to Practice", Second edition, Wiley Publication, Feb. 17, 2009, 791 pages.
(Continued)

*Primary Examiner* — Nathan Mitchell
*Assistant Examiner* — Sayed T Zewari
(74) *Attorney, Agent, or Firm* — Mintz Levin Cohn Ferris Glovsky and Popeo, P.C.

(57) ABSTRACT

Methods and apparatus, including computer program products, are provided for D2D handovers. The method may include sending to a target base station a handover request message including a proposed common identifier for a device-to-device pair and a proposed allocation of radio resources for the device-to-device pair; receiving, from the target base station in response to the handover request message, a handover request reply message including a confirmation of the proposed allocation and of the proposed common identifier; sending to a first device of the device-to-device pair a handover command including the proposed allocation and the proposed common identifier; receiving, from a second device of the device-to-device pair, a measurement report representative of the target base station; and determining whether to initiate a handover of the second device to the target base station, wherein when the handover is initiated, the first device of the device-to-device pair and
(Continued)

the second device of the device-to-device pair are handed over to the target base station. Related apparatus, systems, methods, and articles are also described.

14 Claims, 11 Drawing Sheets

(51) Int. Cl.
*H04W 76/04* (2009.01)
*H04W 84/18* (2009.01)

(58) Field of Classification Search
USPC ............... 455/436, 437, 438, 439, 440, 444
See application file for complete search history.

(56) References Cited

FOREIGN PATENT DOCUMENTS

| CN | 101237672 A | 8/2008 |
|----|-------------|--------|
| WO | 01/62026 A1 | 8/2001 |
| WO | 2005/053346 A1 | 6/2005 |
| WO | 2009/008662 A2 | 1/2009 |

OTHER PUBLICATIONS

"3rd Generation Partnership Project; Technical Specification Group Radio Access Network; Evolved Universal Terrestrial Radio Access (E-UTRA); LTE Physical Layer—General Description (Release 8)", 3GPP TS 36.201, V8.3.0, Mar. 2009, pp. 1-13.

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.9.0, Dec. 2009, pp. 1-83.

"3rd Generation Partnership Project; Technical Specification Group Radio Access Network; Evolved Universal Terrestrial Radio Access (E-UTRA); Multiplexing and Channel Coding (Release 8)", 3GPP TS 36.212, V8.8.0, Dec. 2009, pp. 1-60.

"3rd Generation Partnership Project; Technical Specification Group Radio Access Network; Evolved Universal Terrestrial Radio Access (E-UTRA); Physical Layer Procedures (Release 8)", 3GPP TS 36.213, V8.8.0, Sep. 2009, pp. 1-77.

"3rd Generation Partnership Project; Technical Specification Group Radio Access Network; Evolved Universal Terrestrial Radio Access (E-UTRA); Physical layer—Measurements (Release 8)", 3GPP TS 36.214, V8.7.0, Sep. 2009, pp. 1-12.

Office Action received for corresponding EP Patent Application No. 10709608.3, dated Jun. 10, 2013, 4 pages.

International Search Report and Written Opinion received for corresponding International Patent Application No. PCT/US2010/026417, dated Nov. 18, 2010, 12 pages.

Office action received for corresponding Chinese Patent Application No. 201080065191.X, dated Jul. 1, 2014, 11 pages of Office Action and no English translation available.

* cited by examiner

HANDOVER OF DIRECT PEER TO PEER COMMUNICATION

RELATED APPLICATION

This application was originally filed as PCT Application No. PCT/US2010/026417 filed Mar. 5, 2010.

FIELD

The subject matter described herein relates to wireless communications.

BACKGROUND

There are various types of network configurations, including cellular networks, ad-hoc networks, or a combination of both. In the case of the cellular network, the user equipment communicates (e.g., transmits and/or receives) with another user equipment through a base station. In the case of the ad-hoc network, the user equipment communicates directly with another user equipment. Ad hoc networks are also called device-to-device (D2D) networks, which refers to the direct link(s) between user equipment.

Some D2D communications are also controlled by a base station, providing so-called "cellular controlled" D2D communications (which is also referred to as cellular assisted D2D communications). In cellular controlled D2D communications, two devices may be directly linked via a D2D connection, and the devices may be attached to a base station, such as an enhanced Node B (eNB) base station, to exchange control information with the eNB (or other nodes of the network). The control information may include, for example, mode selection information, such as whether D2D communications or cellular connections should be used, resource allocation for the D2D connections, handover information, power control related information, commands (e.g., from the eNB to the D2D devices), resource allocation requests, and/or measurement reports from the D2D devices to the eNB base station.

When two devices are in D2D communications, one of the devices may be handed over to another cell. For example, the first device of the D2D pair may be connected to a first eNB base station, while the second device of the D2D pair may be connected to a second eNB base station. When this is the case, the D2D communications is referred to as a multi-cell D2D connection. The multi-cell D2D connection requires resource allocation not only between the two D2D devices but also between the adjacent cells (e.g., the first and second eNBs). Moreover, the D2D devices are often in close proximity to each other, so it might be useful for the network (e.g., the eNB or other network nodes) and the D2D devices to consider a joint handover to another cell to avoid the multi-cell D2D connection. Although multi-cell D2D connections can be used, initiating separate handovers for each device may cause extra burden for the device and the network in terms of additional control signaling and decreased efficiency of the D2D connection.

SUMMARY

In one aspect there is provided a method. The method may include sending to a target base station a handover request message including a proposed common identifier for a device-to-device pair and a proposed allocation of radio resources for the device-to-device pair; receiving, from the target base station in response to the handover request message, a handover request reply message including a confirmation of the proposed allocation and of the proposed common identifier; sending to a first device of the device-to-device pair a handover command including the proposed allocation and the proposed common identifier; receiving, from a second device of the device-to-device pair, a measurement report representative of the target base station; and determining whether to initiate a handover of the second device to the target base station, wherein when the handover is initiated, the first device of the device-to-device pair and the second device of the device-to-device pair are handed over to the target base station.

In one aspect there is provided a method. The method may include sending, by a source base station, to a first device, a request to measure one or more aspects of at least one of a target base station and a target cell, when the source base station makes a first decision to handover a second device to the target base station and the target cell, wherein the first and second devices are a device-to-device pair and the first and second devices are controlled by the source base station; sending from the source base station to the target base station a handover request to handover the first device to the target base station and the target cell based on measurements received from the first device, the handover request further indicating the second device; and initiating, in response to a reply to the handover request, a joint handover of the first and second devices to handover to the target base station and the target cell the first and second devices including the device-to-device communications between the first and second devices.

In one aspect there is provided a method. The method may include sending to a target base station a handover request message including a proposed common identifier for a device-to-device pair and a proposed allocation of radio resources for the device-to-device pair, the device-to-device pair comprising a first device and a second device; receiving, from the target base station in response to the handover request message, a handover request reply message including a confirmation of the proposed allocation and of the proposed common identifier; sending to the first device of the device-to-device pair a handover command including the proposed allocation and the proposed common identifier; and receiving, from the target base station, at least one of a request for context information for the second device and a callback indication of a handover of the second device, the second device autonomously initiating the handover to the target base station.

In one aspect there is provided a method. The method may include sending to a target base station a handover request message including a proposed common identifier for a device-to-device pair and a proposed allocation of radio resources for the device-to-device pair, the device-to-device pair comprising a first device and a second device, wherein a handover is initiated by at least one of the first device and the second device; receiving, from the target base station in response to the handover request message, a handover request reply message including a confirmation of the proposed allocation and of the proposed common identifier; and sending to the first device and the second device of the device-to-device pair a joint handover command including the proposed allocation and the proposed common identifier.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
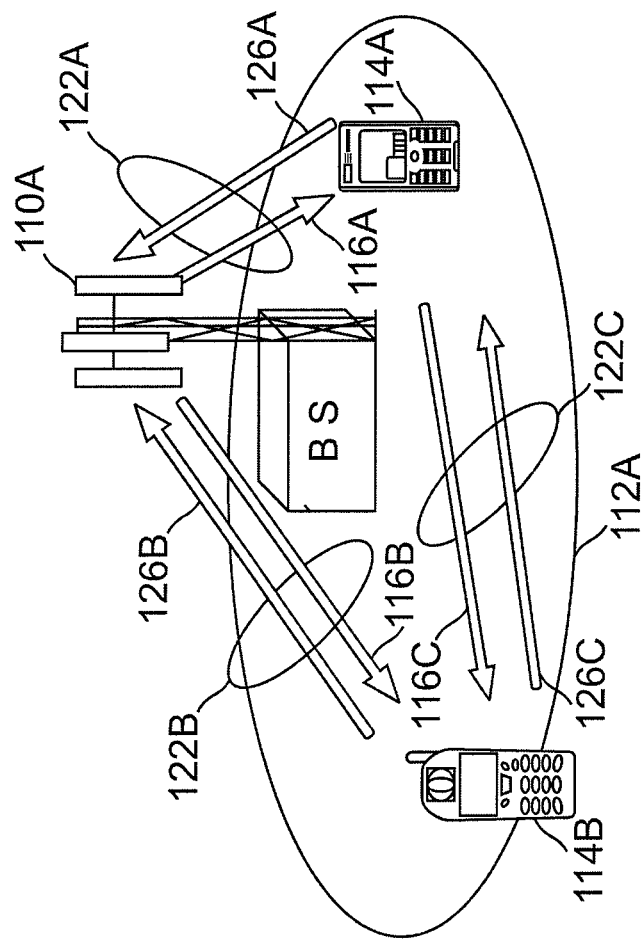
FIG. 1 depicts a block diagram of a wireless communication system.
Figure 1:
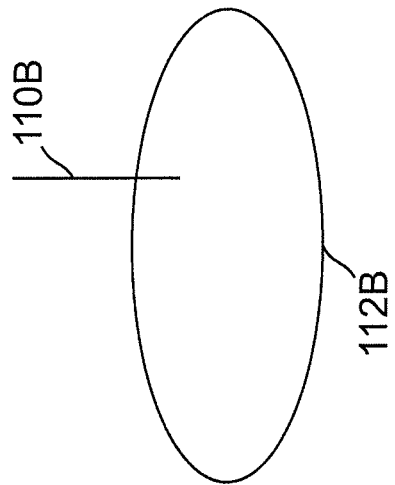

Like labels are used to refer to same or similar items in the drawings.

DETAILED DESCRIPTION

The subject matter described herein relates mechanisms for handing over both D2D devices rather than maintaining a multi-cell D2D configuration in which each D2D device is coupled to a separate base station. Before providing a detailed description of those mechanisms, FIG. 1 provides a general description of the system environment in which the D2D handover mechanisms may be implemented.

FIG. 1 is a simplified functional block diagram of a wireless communication system 100. The wireless communication system 100 includes base stations 110A-B each supporting a corresponding service or coverage area 112A-B (also referred to as a cell). The base stations 110A-B are also capable of communicating with wireless devices, such as user equipment 114A-B, within the coverage area. Although FIG. 1 depicts two base stations 110A-B, two coverage areas 112A-B, and two user equipment 114A-B, other quantities of base stations, coverage areas, and user equipment may be implemented as well.

In some implementations, the base stations 110A-B are implemented as an evolved Node B (eNB) type base station consistent with standards, including the Long Term Evolution (LTE) standards, such as 3GPP TS 36.201, "Evolved Universal Terrestrial Radio Access (E-UTRA); Long Term Evolution (LTE) physical layer; General description," 3GPP TS 36.211, "Evolved Universal Terrestrial Radio Access (E-UTRA); Physical channels and modulation," 3GPP TS 36.212, "Evolved Universal Terrestrial Radio Access (E-UTRA); Multiplexing and channel coding," 3GPP TS 36.213, "Evolved Universal Terrestrial Radio Access (E-UTRA); Physical layer procedures," 3GPP TS 36.214, "Evolved Universal Terrestrial Radio Access (E-UTRA); Physical layer—Measurements," and any subsequent additions or revisions to these and other 3GPP series of standards (collectively referred to as LTE standards). The base station 110A-B may also be implemented consistently with the Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, IEEE 802.16m, Advanced Air Interface, and any subsequent additions or revisions to the IEEE 802.16 series of standards (collectively referred to as IEEE 802.16).

In some implementations, the wireless communication system 100 may include access links, such as access links 122A-B, between the base stations and the user equipment. The wireless communication system 100 may also include device-to-device (D2D) links, such as D2D links 122C, between the user equipment 114A-B. The access links 122A-B may also include a downlink, such as downlinks 116A and 116B, for transmitting from the base station 110A to a corresponding user equipment. The access links 122A-B may also include an uplink, such as uplinks 126A and 126B, for transmitting from the user equipment to the base station. Although not depicted at FIG. 1, base station 110B may also include the links described herein (e.g., the access links, D2D links, uplinks, and downlinks).

Although the base stations 110A-B are described as eNB type base stations, the base stations may be configured in other ways as well and include, for example, cellular base station transceiver subsystems, gateways, access points, radio frequency (RF) repeaters, frame repeaters, nodes, and include access to other networks as well. For example, base stations 110A-B may have wired and/or wireless backhaul links to other network nodes, such as other base stations, a radio network controller, a core network, a serving gateway, a mobility management entity, a serving GPRS (general packet radio service) support node, and the like.

The user equipment 114A-B may be mobile and/or stationary. Moreover, the user equipment 114A-B may be referred to as, for example, devices, mobile stations, mobile units, subscriber stations, wireless terminals, terminals, or the like. The user equipment may be implemented as, for example, a wireless handheld device, a wireless plug-in accessory, or the like. For example, the user equipment may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface.

In some implementations, the links 116A-C and 126A-C each represent a radio frequency (RF) signal. The RF signal may include data, such as voice, video, images, Internet Protocol (IP) packets, control information, and any other type of information. When IEEE-802.16 and/or LTE are used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. Moreover, in some implementations, the wireless communication system 100 can be configured to comply substantially with a standard system specification, such as LTE or other wireless standards, such as WiBro, WiFi, Bluetooth, IEEE 802.16, or it may be a proprietary system. For example, links 116C and 126C may be configured as D2D links in accordance with WiFi or Bluetooth, and links 116A-B and 126A-B may be configured as uplinks and downlinks in accordance with LTE and/or LTE-Advanced.

Device-to-device (D2D) communication links may be incorporated in public land mobile systems, such as the 3rd Generation Partnership Project (3GPP) as well as subsequent generations of wireless systems to provide cellular controlled D2D communications. The cellular system, such as the base stations 110A-B, may be used to aid in the establishment and ongoing control of the D2D links 122C (e.g., radio resources used by the D2D links, handover control, etc).

In some implementations, there are provided mechanisms for a handover of D2D connections to avoid a multi-cell D2D connection. Although a multi-cell D2D connection may be used in some situations, if the D2D devices are relatively close to each other and one of the D2D devices is handed over to another cell, it is likely more efficient to avoid a multi-cell D2D connection. In particular, two devices, such as user equipment 114A-B, are communicating directly via a D2D connection 122C in a source cell 112A. Based on measurement reports, the network (e.g., eNB 110A or another node in the network 100) triggers a handover for user equipment 114B to a target cell, such as target cell 112B. During the handover of user equipment 114B to target cell 112B, the network may avoid a multi-cell D2D connection. The following provides examples processes to avoid the multi-cell D2D connection, so that both D2D devices, such as user equipment 114A-B, are served by the same base station and cell (e.g., eNB 110B at target cell 112B).

Figure 2:
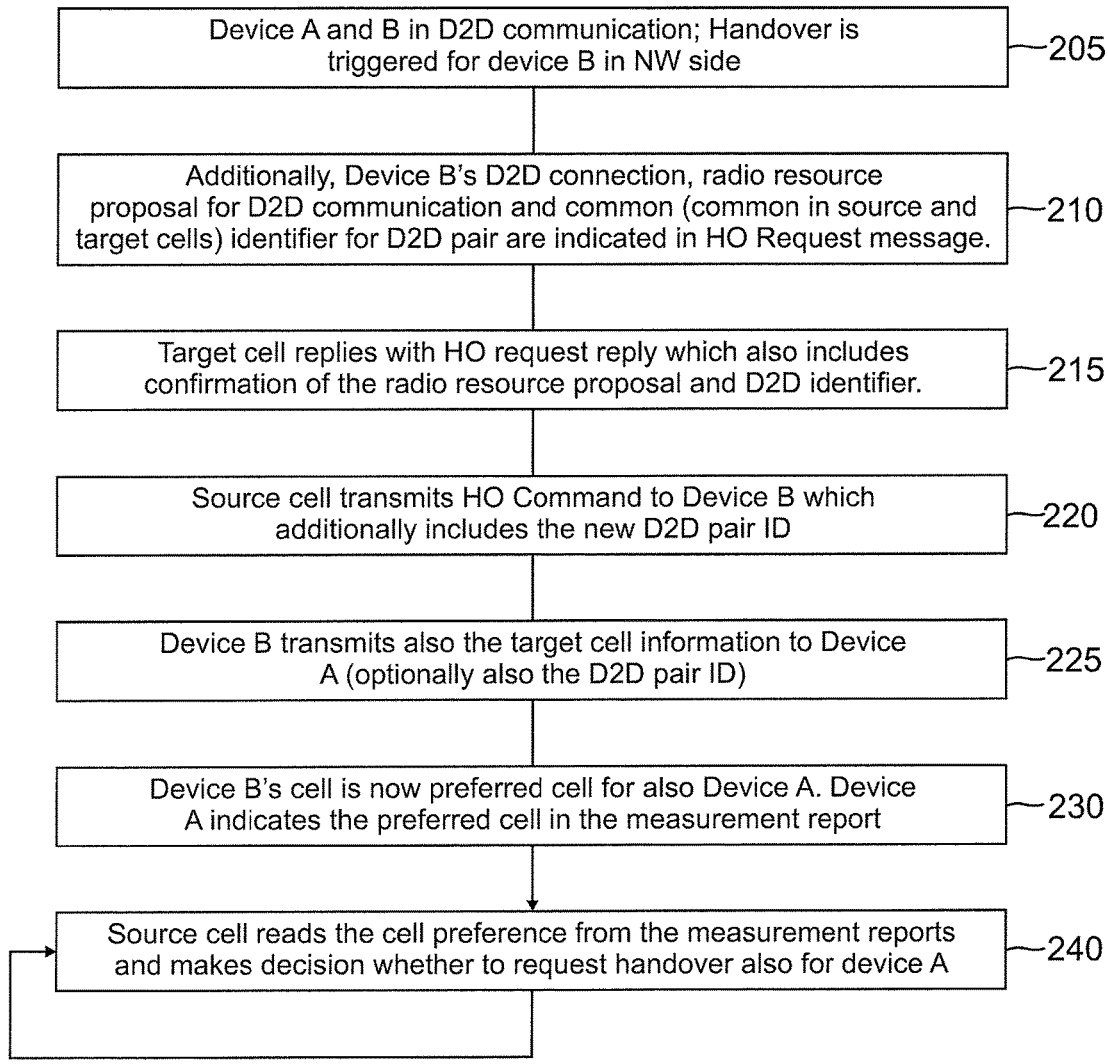
FIG. 2 depicts a process 200 for D2D handover.

FIG. 2 depicts a process 200 for D2D handover. Referring to FIGS. 1 and 2, user equipment 114A-B are attached to a source cell via eNB 110A, communicating thus via the resources of source cell 112A.

At 205, the network (e.g., eNB 110A) triggers a handover for user equipment 114B. The handover may be triggered by eNB 110A based on measurement reports received by the eNB 110A from the user equipment 114B. For example, the measurement report may include information, such as link quality, base station load, and the like, indicating that a handover to another target cell should be initiated.

At 210, the eNB 110A for source cell 112A sends a handover request to the target cell 112B. The hand over request includes a proposal for D2D communication resources in the target cell 112B (e.g., an allocation of radio resources for the D2D link and user equipment 114A-B), a D2D pair identifier (e.g., a new, common D2D radio network temporary identifier (RNTI) which would be valid and common to both the source and target cells 112A-B). Thus, the D2D pair identifier is common in both cells 112A-B and is valid (i.e., can be used without conflict) in both cells 112A-B.

At 215, the target cell 112B performs admission control and replies with handover request reply, which includes a confirmation of the new D2D pair identifier and confirmation of the resources allocated at target cell 112B. For example, the confirmation may confirm the most suitable resources to be allocated to the D2D pair of user equipment 114A-B in the target cell 112B from an inter cell interference point of view (which assumes that the source cell 112A is still scheduling resources for user equipment 114A-B). For example, the Radio Network Temporary Identifier (RNTI) is used to identify cellular users and identify a D2D pair that allows the D2D pair to receive resource allocation messages (like cellular users) from the eNB. The allocated resources may be the same resources used for cellular users (e.g., the eNB base stations allocates resources for the D2D pair from the same pool of resources as the cellular users).

At 220, the eNB 110A of source cell 112A transmits a handover command to user equipment 114B. The handover command includes the new D2D pair identifier and the resource allocation which was requested and confirmed at 210 and 215. The user equipment 114B may then reconfigure its physical layer, L1, and media access control layer, L2, via L1/L2 control signaling. Moreover, the user equipment 114B transmits a handover confirm message to eNB 110B of target cell 112B.

At 225, user equipment 114B transmits information representative of the target cell 112B to user equipment 114A. The transmitted target cell information may include at least cell id, maybe also bandwidth configuration if different from in source cell due to possible bandwidth shrinking for power saving purposes either in source or in target. If the network has not signaled the new, common D2D pair identifier to user equipment 114A, the user equipment 114B may include in the transmitted target cell information the new, common D2D pair identifier (which was requested and confirmed at 210 and 215).

At 230, user equipment 114A recognizes the target cell 112B where user equipment 114B is attached and indicates that the target cell 112B is a preferred cell in a measurement report sent to the eNB 110A.

At 240, the eNB 110A for source cell 112A may request user equipment 114A to handover to the target cell 112B if, for example, the quality (e.g., signal strength, load, etc) of the target cell 112B is adequate for communications. Handing over user equipment 114A would thus reduce the scheduling and signaling burden of a multi-cell D2D connection.

Figure 3:
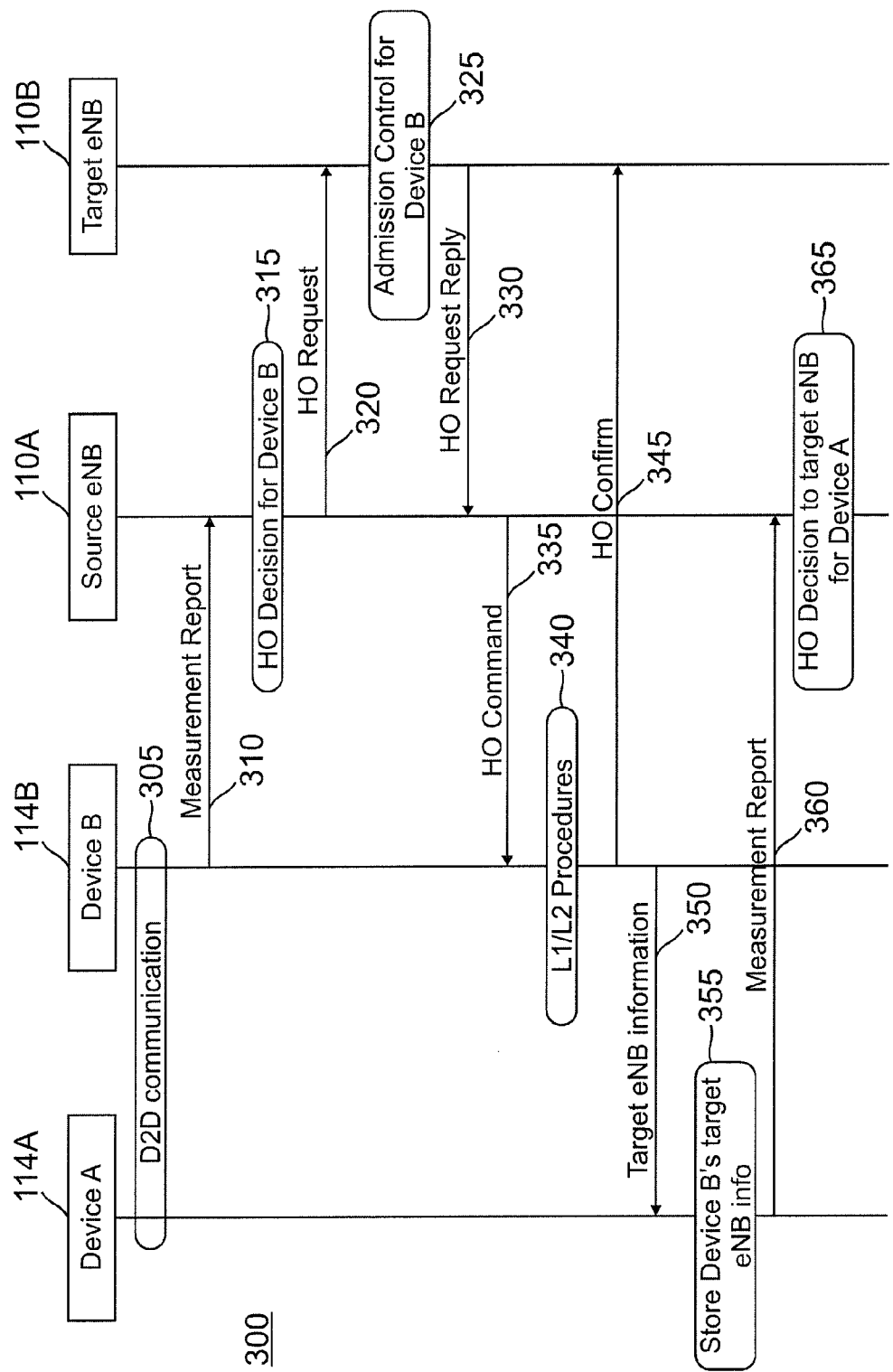
FIG. 3 depicts a signaling process for FIG. 2.

FIG. 3 depicts the process 200 as a signaling process 300. The description of FIG. 3 also refers to FIGS. 1 and 2.

At 305, user equipment 114A-B may each be in D2D communications via links 122C. The D2D communications 122C may be cellular enhanced via links 122A-B to eNB 110A.

At 310, user equipment 114B sends a measurement report to the source eNB 110A.

At 315, the source eNB 110A makes a handoff decision for user equipment 114B based on the received measurement report. For example, the received measurement report may provide information regarding the quality of the received signal at the user equipment 114B (e.g., poor quality may indicate a need to handover) or the load at source eNB 110B (e.g., an overloaded eNB may handover a connection to another base station).

At 320, the source eNB 110A may, based on the measurement report, send a handover request to the target eNB 110B.

At 325, the target eNB 110B performs admission control for user equipment 114B, resulting in a handover request reply to source eNB 110A at 330. Based on the received handover request reply, the source eNB 110A sends a handover command 335 to user equipment 114B.

At 340, the user equipment 114B reconfigures layers L1/L2 and transmits, at 345, a handover confirm message to target eNB 110B.

At 350, the user equipment 114B transmits information representative of the target cell 112B and/or eNB 110B to user equipment 114A.

At 355, the user equipment 114A may then store the received target cell 112B/eNB 110B information.

At 360, the user equipment 114A has information regarding eNB 110B where user equipment 114B is attached. The user equipment 114A may thus indicate in a measurement report that eNB 110B (or the cell 112B corresponding to eNB 110B) is a preferred cell.

At 365, the eNB 110A (or another node of network 100) may, based on the received measurement report, make a handover decision 110B for user equipment 114A. For example, given the preference indicated by the user equipment 114A, quality, load, and the like, the eNB 110A may determine that a handover for user equipment 114A should be performed, which would may reduce the scheduling and signaling burden of a multi-cell D2D connection.

Figure 4:
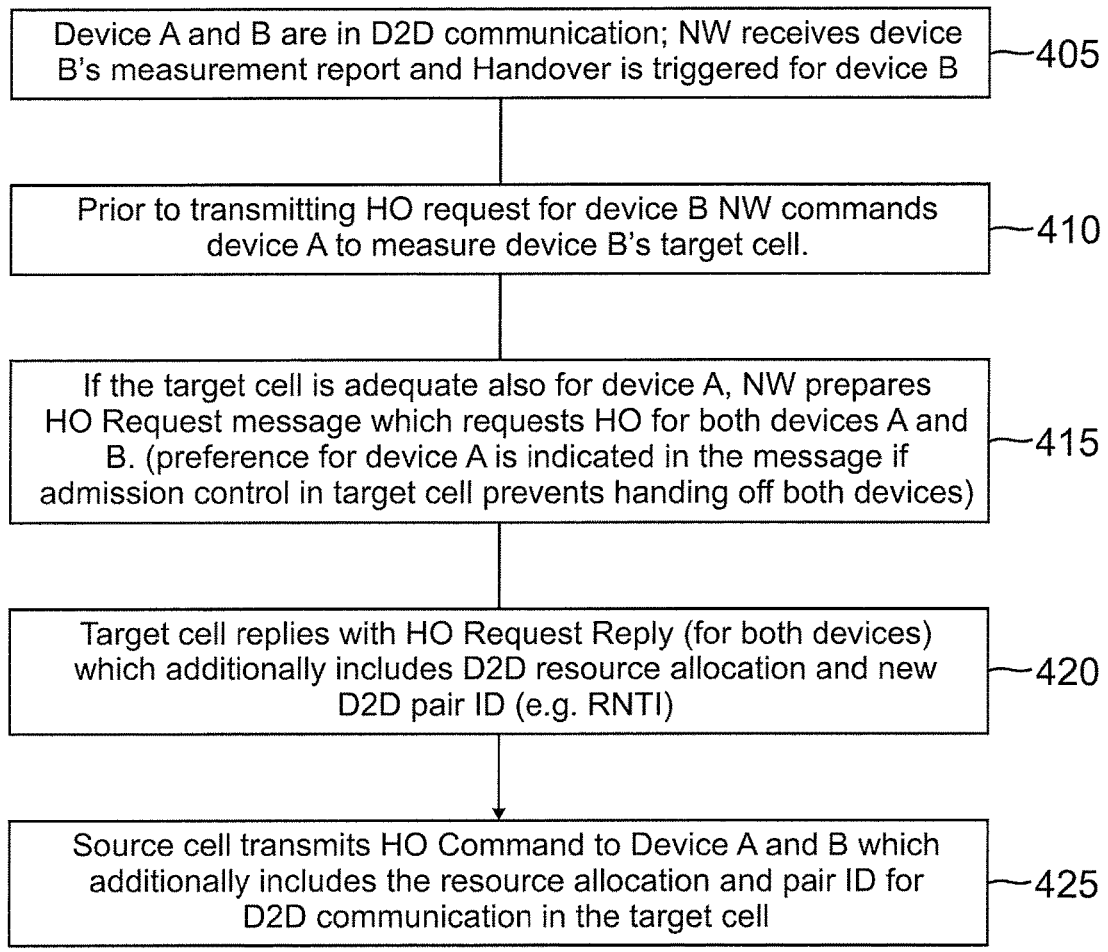
FIG. 4 depicts a process 400 for D2D handover of both devices.

FIG. 4 depicts a process 400 where both user equipment 114A-B are handed off at about the same time.

At 405, user equipment 114A-B are each communicating via D2D communication (e.g., via links 122C) and coupled to source eNB 110A (e.g., via links 122A-B) using source cell 112A resources. Based on a measurement report received at eNB 110A from user equipment 114B, eNB 110A initiates a handover for user equipment 114B.

At 410, before requesting the handover for user equipment 114B, eNB 110A makes a request to the user equipment 114A to measure the target cell 112B (which is the target of the user equipment 114B hand over). The user equipment 114A may measure the received signal quality from eNB 110B at target cell 112B, and report those measurements to eNB 110A.

At 415, if the target cell 112B is also adequate for user equipment 114A, the eNB 110A for the source cell 112A sends a handover request to eNB 110B of the target cell 112B. This handover request indicates that both user equipment 114A-B should be handed over to eNB 110B of target cell 112B. The handover request may indicate a priority for user equipment 114B for admission control purposes. The priority is given to a device to which a handover is initially triggered rather than the other device that may be in the source cell given that the target cell does not allow both devices to move to the target cell. The handover request message may also include communication resources and a new D2D pair identifier (e.g., D2D radio network temporary identifier (RNTI), which is common and valid in both cells 112A-B).

At 420, the eNB 110B for target cell 112B performs admission control and replies to the source eNB 110A with a handover request reply. The handover request reply may include the confirmation of the new D2D pair identifier and the D2D resources allocated in the target cell 112B. For example, the D2D resources may include the radio resources allocated to the D2D connection between user equipment 114A-B as well as the cellular resources allocated to each of the user equipment 114A-B.

At 425, the eNB 110A for source cell 112A transmits a common handover command to user equipment 114A-B. The common handover command may include information such as the new D2D pair identifier (which is valid and common to both cells 112A-B) and resources allocated in the target cell 112B (e.g., D2D radio resources and cellular radio resources). The user equipment 114A-B may then reconfigure L1/L2 layers accordingly, and transmit handover confirm message to eNB 110B for target cell 112B.

Figure 5:
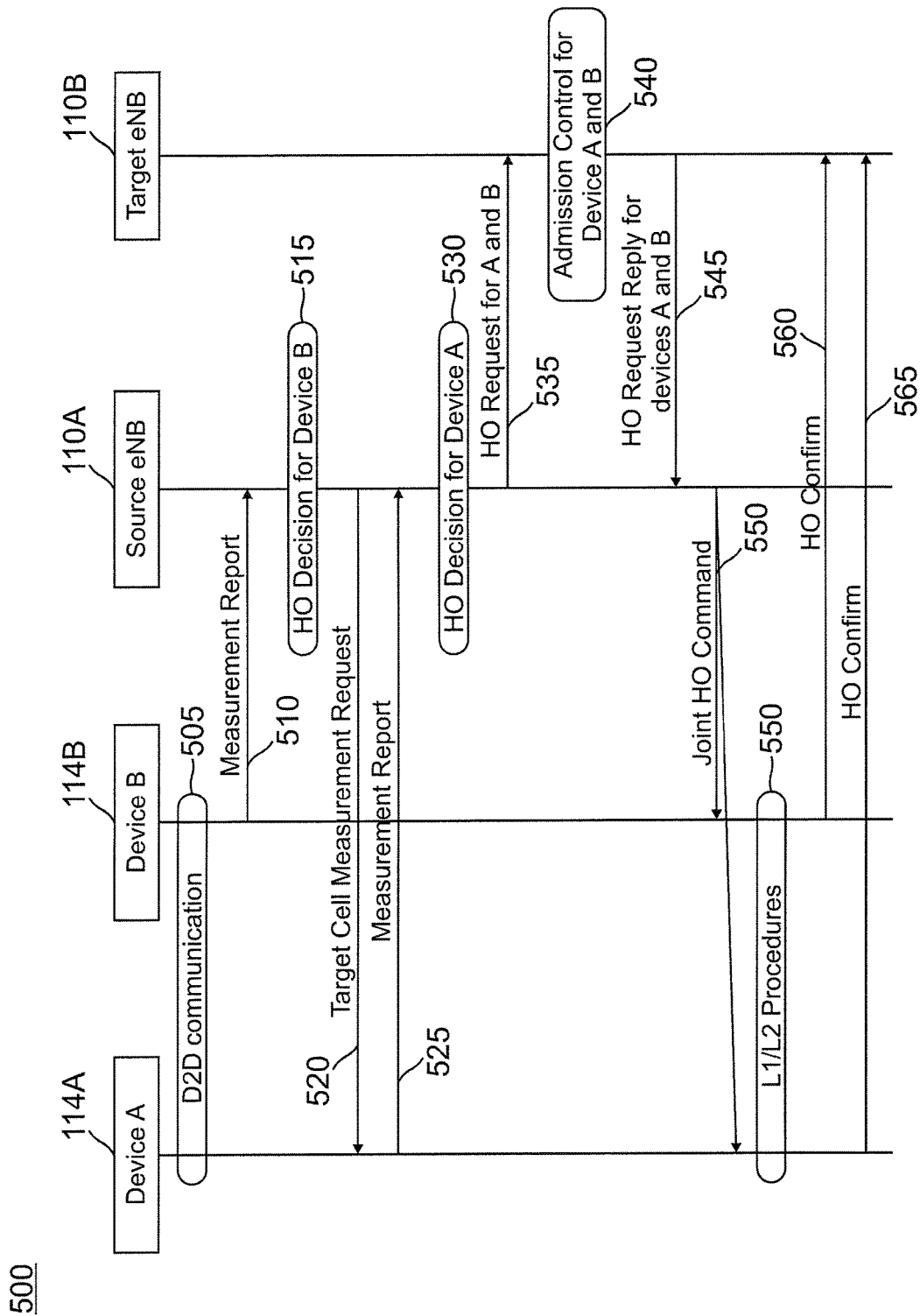
FIG. 5 depicts a signaling process for FIG. 4.

FIG. 5 depicts the signaling process 500 described above with respect to FIG. 4. The description of FIG. 5 also refers to FIGS. 1 and 2.

At 505, user equipment 114A-B are each communicating via D2D communication (e.g., via links 122C) and coupled to source eNB 110A (e.g., via links 122A-B) using the resources of source cell 112A.

At 510, user equipment 114B sends a measurement report to the source eNB 110A.

At 515, the source eNB 110A makes a handoff decision for user equipment 114B based on the received measurement report. For example, the received measurement report may provide information regarding the quality of the received signal from the user equipment 114B (e.g., poor quality may indicate a need to handover) or the load at source eNB 110A (e.g., an overloaded eNB may handover a connection).

At 520, before requesting the handover for user equipment 114B, the eNB 110A requests the user equipment 114A to measure target cell 112B (e.g., signal received from eNB 110B). The user equipment 114A measures the target cell 112B, as described above at 410.

At 525, user equipment 114A sends a measurement report to eNB 110A. The measurement report includes measurements of the target cell 112B (which were measured by the user equipment 114A or another node of network 100).

At 530, the eNB 110A makes a handover decision for user equipment 114A based on the received measurement report.

At 535, if the target cell 112B is adequate for user equipment 114A and user equipment 114B, the eNB 110A sends a handover request to the eNB 110B at 535, requesting handovers for both user equipment 114A-B. As noted above with respect to 415, the handover request may indicate a priority for user equipment 114B for admission control purposes. When inadequate, the multi-cell D2D will occur if over-the-cell D2D is supported; otherwise mode selection will revert back to the cellular mode.

At 540, the eNB 110B for target cell 112B performs admission control and replies to the source eNB 110A with a handover request reply at 545. The handover request replay may include the confirmation of the new D2D pair identifier and the allocated resources in target cell 112B (e.g., D2D radio resources allocated for user equipment 114A-B as well as allocated cellular resources for user equipment 114A-B).

At 550, eNB 110A for source cell 112A transmits a handover command jointly to both user equipment 114A and user equipment 114B. The handover command may include the D2D pair identifier (e.g., the new pair identifiers) and D2D resources.

At 555, user equipment 114A-B then reconfigure the L1/L2 layers, and transmit, at 560-565, handover confirm messages to eNB 110B for target cell 112B.

Figure 6:
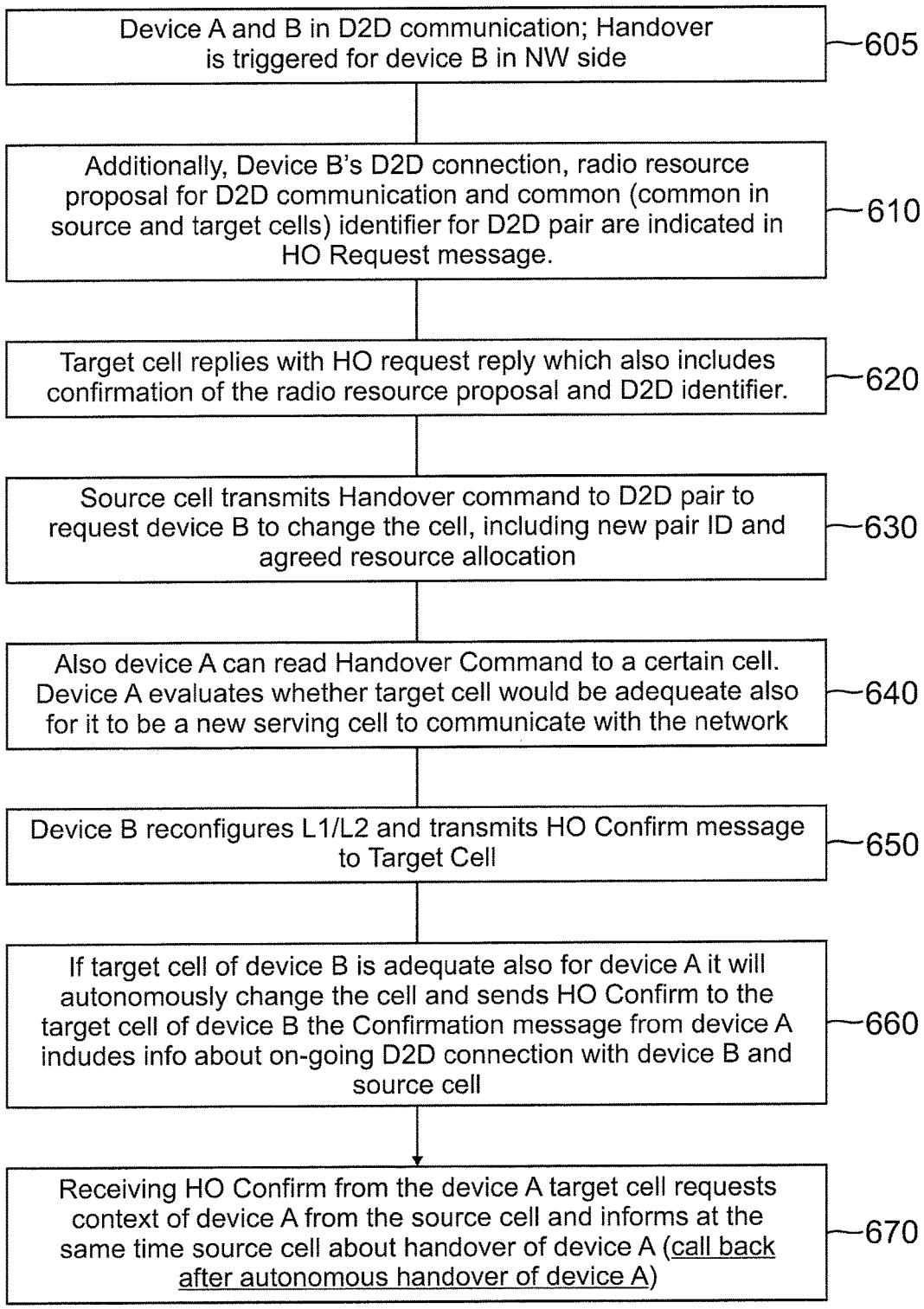
FIG. 6 depicts a process 600 for D2D handover using callback.

FIG. 6 depicts a process 600 for callback handover signaling.

At 605, user equipment 114A-B may each be in D2D communications via links 122C. The D2D communications 122C may be cellular enhanced via links 122A-B to eNB 110A. Based on the measurement reports of user equipment 114B, a handover is triggered for user equipment 114B.

At 610, the eNB 110A for source cell 112A sends a handover request to eNB 110B for target cell 112B. The handover request may include a proposal for the D2D communication resources and new D2D pair identifiers (e.g., a D2D RNTI, which is common to and valid in both cells 112A-B).

At 620, the eNB 110B for target cell 112B performs admission control for the proposed D2D connection and replies with a handover request reply, which includes the confirmation of the new D2D pair identifier and confirmation of resources (e.g., from the inter cell interference point of view, so that there is agreement on resources for the D2D pair among source and target cells), assuming that the source cell 112A still schedules resources for the user equipment 114A-B.

At 630, the eNB 110A of source cell 112A transmits a handover command to user equipment 114B. The handover command requests user equipment 114B to change to target cell 112B. The handover command further includes the new D2D pair identifier and agreed resource allocation in the new cell (which in this example is target cell 112B).

At 640, the user equipment 114A may also receive the handover command sent at 630 to user equipment 114B. The user equipment 114A may proceed to evaluate whether the target cell 112B would be adequate (e.g., meaning that user equipment 114A would not want to immediately change back to the source cell 112A if a handover to target cell 112B is made). Moreover, receiving the handover command to move user equipment 114A of the D2D pair may also trigger increasing the priority of the target cell 112B in the handover evaluation process, so that the probability that user equipment 114A would also move to the target cell 112B increases.

At 650, user equipment 114B reconfigures the L1 and L2 layers and transmits a handover confirm message to the eNB 110B for the target cell 112B.

At 660, if target cell 112B is also adequate for user equipment 114A, user equipment 114A may autonomously change to target cell 112B and send a handover confirm to the eNB 110B of the target cell 112B. The confirmation message from user equipment 114A may include information about the on-going D2D connection (e.g., resources for links 122C, D2D pair identifier, etc.) with user equipment 114B.

At 670, when the handover confirmation message is received from user equipment 114A at the eNB 110B, the eNB 110B of target cell 112B may request the context of user equipment 114A from the source eNB 110A at source cell 112A. The eNB 110B may also inform, at about the same time, the eNB 110A of source cell 112A about the handover of user equipment 114A (which is thus a callback after an autonomous handover of user equipment 114A). In some implementations, the process 600 may speed up the handover of the user equipment 114A.

Figure 7:
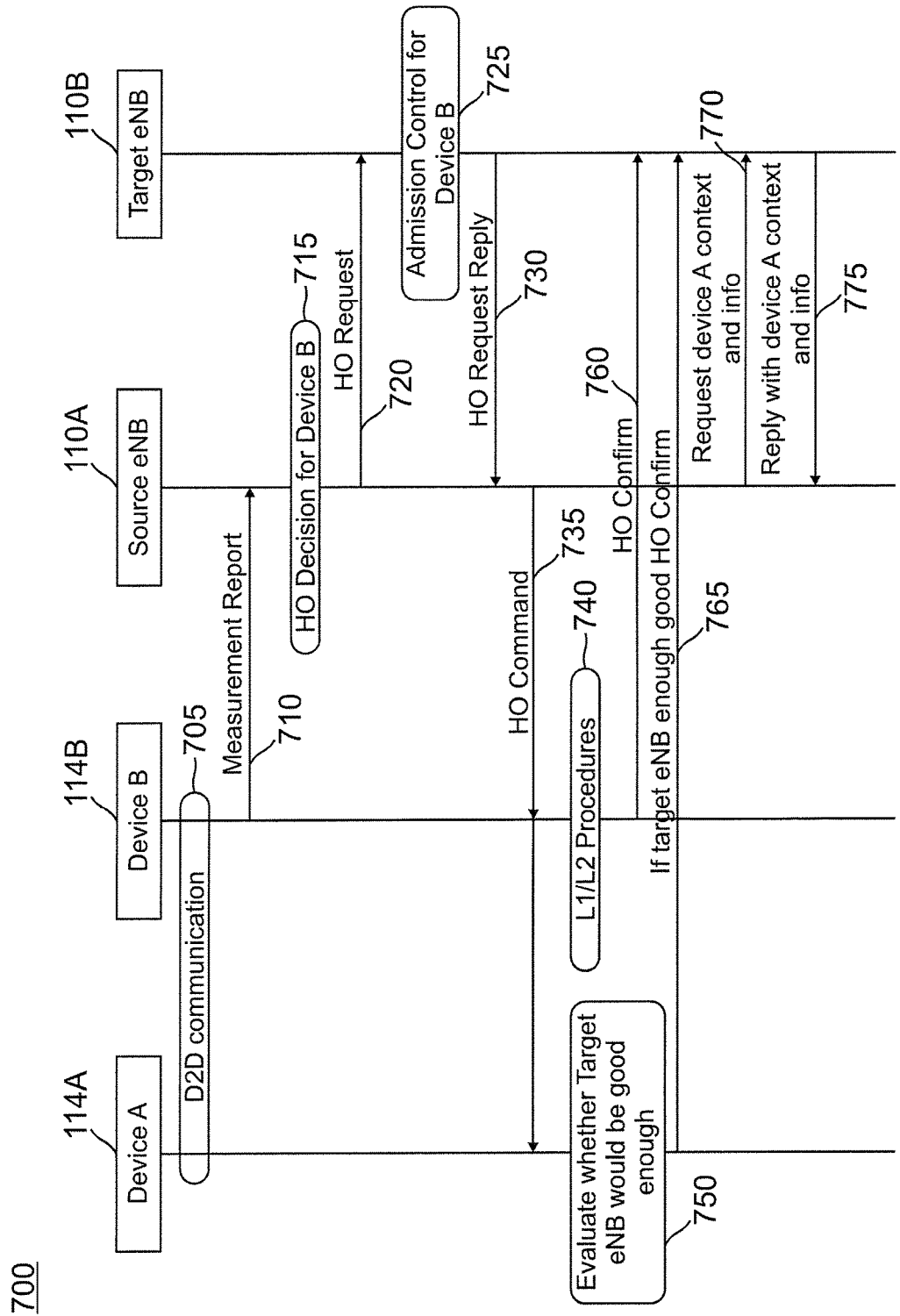
FIG. 7 depicts a signaling process for FIG. 6.

FIG. 7 depicts a signaling process 700 for process 600 described with respect to FIG. 6.

At 705, user equipment 114A-B are each communicating via D2D communication (e.g., via links 122C) and coupled to source eNB 110A (e.g., via links 122A-B) using resources of the source cell 112A.

At 710, user equipment 114B sends a measurement report to the source eNB 110A.

At 715, the source eNB 110A makes a handoff decision for user equipment 114B based on the received measurement report. For example, the received measurement report may provide information regarding the quality of the received signal from the user equipment 114B (e.g., poor quality may indicate a need to handover) or the load at source eNB 110B (e.g., an overloaded eNB may handover a connection).

At 720, eNB 110A for source cell 112A sends a handover request to eNB 110B for target cell 112B. The handover request may include a proposal for the D2D communication resources and the new D2D pair identifiers (e.g., a D2D RNTI, which is valid and common in both cells 112A-B).

At 725, eNB 110B for target cell 112B performs admission control, as described above at 620.

At 730, the target eNB 110B sends a handover request reply to source eNB 110A.

At 735, the eNB 110A of source cell 112A transmits a handover command to user equipment 114B. Because user equipment 114A is proximate to user equipment 114B, user equipment 114A may be able to listen to the handover command sent to user equipment 114B. The user equipment 114A can thus autonomously proceeds to evaluate whether the target cell 112B would be adequate, as described above at 640.

At 740, user equipment 114B reconfigures the L1 and L2 layers and transmits a handover confirm message to the eNB 110B for the target cell 112B, as described above at 650.

At 750, user equipment 114A (which received the handover command to move user equipment 114B to the target cell 112B as described above at 640) evaluates whether the target cell 112B is adequate, as described above at 640.

At 765, the user equipment 114A may send a handover confirm command to target eNB 110B as described above at 660, when the target cell 112B served by eNB 110B is deemed adequate at 750.

At 770, when the handover confirmation message is received from user equipment 114A at the eNB 110B, the eNB 110B of target cell 112B may request the context of user equipment 114A from the eNB 110A for source cell 112A, as described above at 670.

At 775, the source eNB 110A may respond to target eNB 110B with the context.

Figure 8:
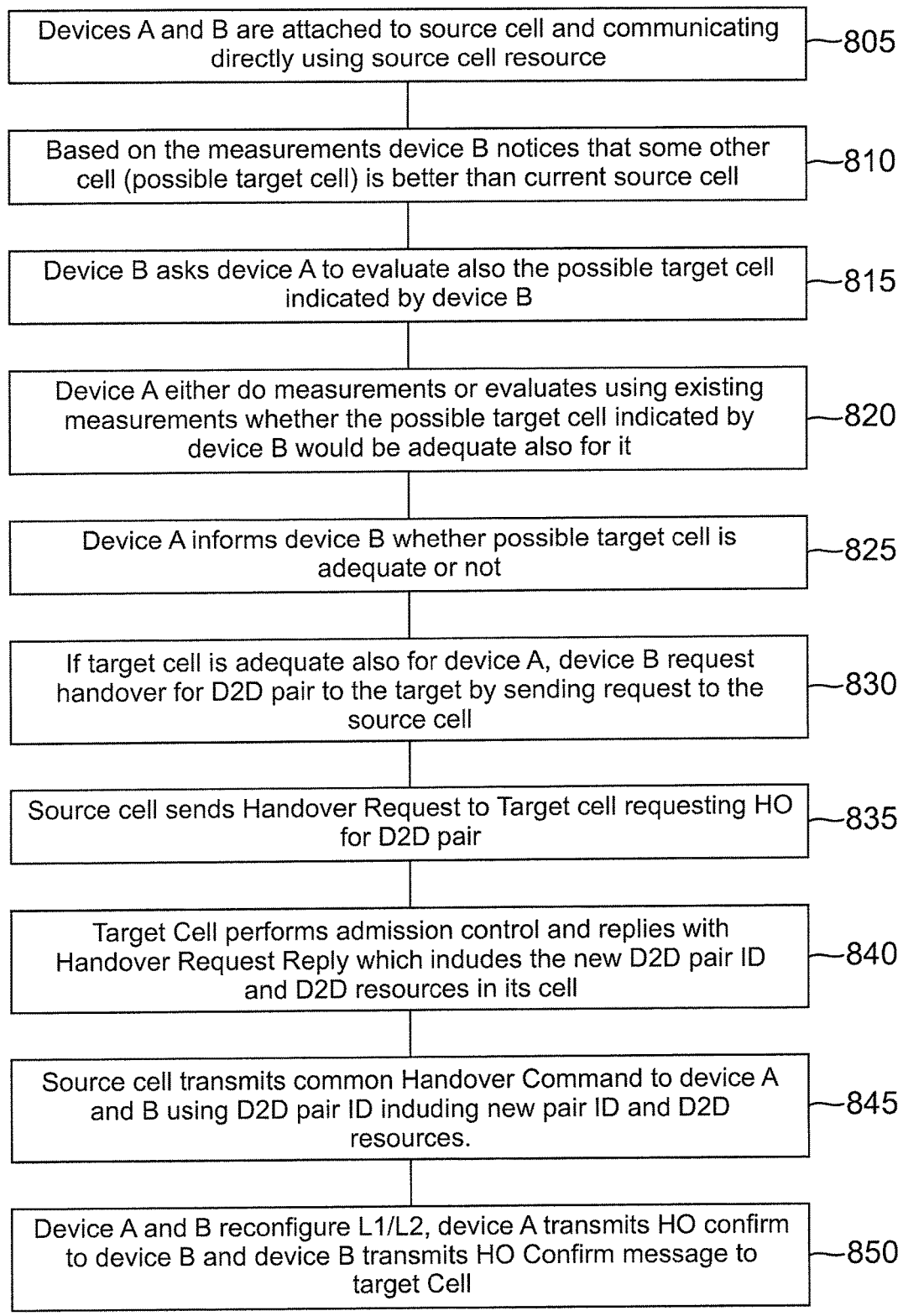
FIG. 8 depicts a process 800 for device initiated D2D handover.

FIG. 8 depicts a process 800 for user equipment triggered D2D pair handover.

At 805, the user equipment 114A-B may each be in D2D communications via links 122C. The D2D communications 122C may be cellular enhanced via links 122A-B to eNB 110A.

At 810, the user equipment 114B determines, based on measurements at user equipment 114B, that another cell (e.g., a possible target cell 112B) is better than current source cell 112A.

At 815, the user equipment 114B sends a message to the user equipment 114A. This message prompts user equipment 114A to evaluate the possible target cell 112B indicated by user equipment 114B.

At 820, the user equipment 114A may determine whether the target cell 112B (which is indicated by user equipment 114B) would be adequate for communications (e.g., quality of link, load, etc). The determination may include performing measurements of the target eNB 110B of the target cell 112B (which may also include evaluating existing measurements). In this context, adequate means that the difference between the quality of the current cell 112A and possible target cell 112B is within a given offset to prevent an immediate handover triggering back to the currently serving cell 112A after the handover to the possible target cell 112B is performed.

At 825, the user equipment 114A provides a measurement report to inform the user equipment 114B whether the target cell 112B is adequate or not.

At 830, if target cell 112B is adequate for user equipment 114A, user equipment 114B sends a handover request to the source eNB 110A. The handover request initiates a handover of the D2D pair 114A-B to the target cell 112B.

At 835, the source eNB 110A for source cell 112A sends a handover request to the target eNB 110B to request handovers for both devices 114A-B.

At 840, the target eNB 110B performs admission control. The target eNB 110B also replies with a handover request reply, which includes the new D2D pair identifier for user equipment 114A-B (which is common and valid in both the source and target cells 112A-B) and the D2D resources allocated for user equipment 114A-B in the target cell 112B.

At 845, the eNB 110A for source cell 112A transmits a common handover command to user equipment 114A and user equipment 114B. The command may include the new D2D pair identifier and the allocated D2D resources.

At 850, the user equipment 114A and user equipment 114B reconfigure the L1/L2 layers. The user equipment 114A transmits a handover confirmation to user equipment 114B. The user equipment 114B may also transmit a handover confirm message to eNB 110B for target cell 112B.

Figure 9:
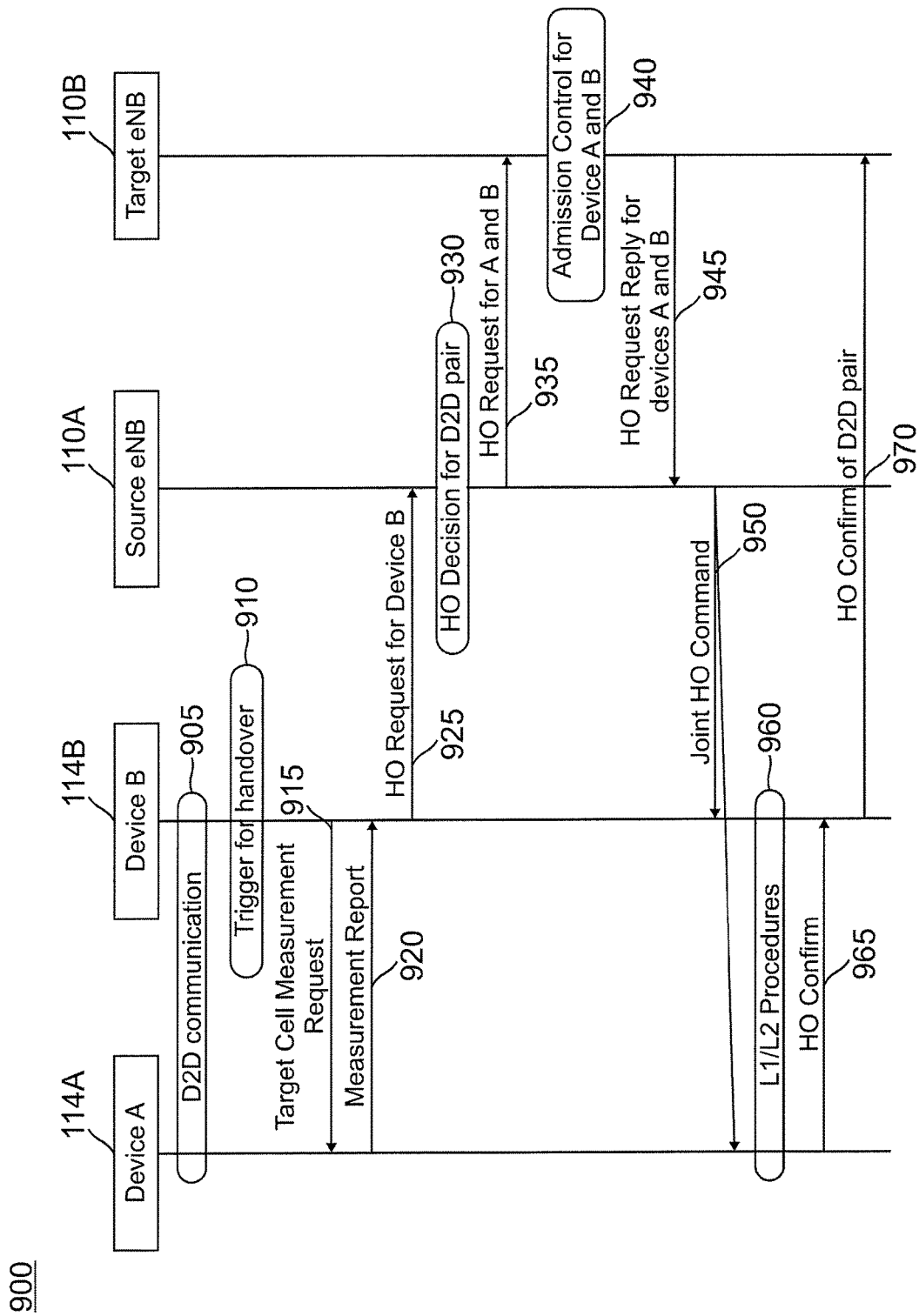
FIG. 9 depicts a signaling process for FIG. 8.

FIG. 9 depicts a signaling process 900 for the process 800 described above.

At 905, the user equipment 114A-B are each communicating via D2D communication (e.g., via links 122C) and coupled to source eNB 110A (e.g., via links 122A-B) using source cell 112A resources.

At 910, the user equipment 114B determines, based on measurements at user equipment 114B, that another cell (e.g., a possible target cell 112B) is better than current source cell 112A. As described above at 815, user equipment 114B sends a message 915 to user equipment 114A, prompting user equipment 114A to evaluate the possible target cell 112B indicated by user equipment 114B. At 920, user equipment 114A responds with a measurement report as described above at 825.

At 925, the user equipment 114B sends a request to the source eNB 110A. As noted above at 830, user equipment 114B requests handover to the target cell 112B for the D2D pair of user equipment 114A-B.

At 930, the eNB 110A makes a handover decision for the D2D pair of user equipment 114A-B. At 935, the eNB 110A sends a handover request to the eNB 110B. This handover request initiates the handovers of both devices 114A-B, as noted above at 835.

At 940-945, the eNB 110B of target cell 112B performs admission control. The eNB 110B also replies with a handover request reply, which includes the new D2D pair identifier and the D2D resources in the target cell 112B.

At 950, the eNB 110A for source cell 112A transmits a common handover command to user equipment 114A and user equipment 114B using the D2D pair identifier, including the new pair identifier and the D2D resources, as described above at 845.

At 960, user equipment 114A and user equipment 114B reconfigure the L1/L2 layers. At 965, the user equipment 114A transmits a handover confirmation to the user equipment 114B. At 970, the user equipment 114B transmits to target eNB 110B the confirm message for both user equipment 114A-B.

Figure 10:
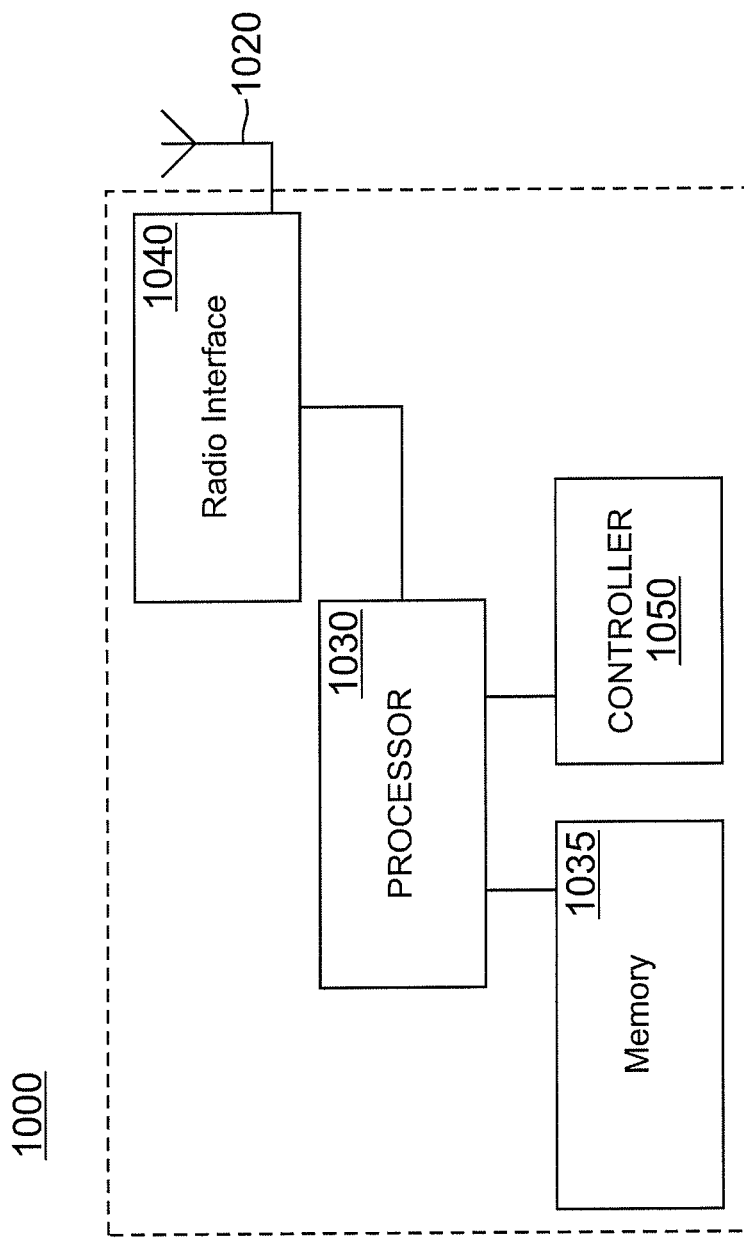
FIG. 10 depicts an example of a user equipment.

FIG. 10 depicts an exemplary user equipment 1000, which may be implemented at one or more of user equipments 114A-B. The user equipment may include an antenna 1020. The user equipment may also includes a radio interface 1040, which may include other components, such as filters, converters (e.g., digital-to-analog converters and the like), symbol demappers, an Inverse Fast Fourier Transform (IFFT) module, and the like, to process symbols, such as OFDMA symbols, carried by a downlink or an uplink. In some implementations, the user equipment may also be compatible with IEEE 802.16, LTE, LTE-Advanced, and the like. The user equipment further includes a processor 1030 for controlling the user equipment and for accessing and executing program code stored in memory 1035.

Furthermore, the user equipment may include a controller 850. For example, the controller 1050 may perform one or more of the D2D related mechanisms described herein including initiating the transmission of messages, initiating measurements, evaluating target cells, and the like.

Figure 11:
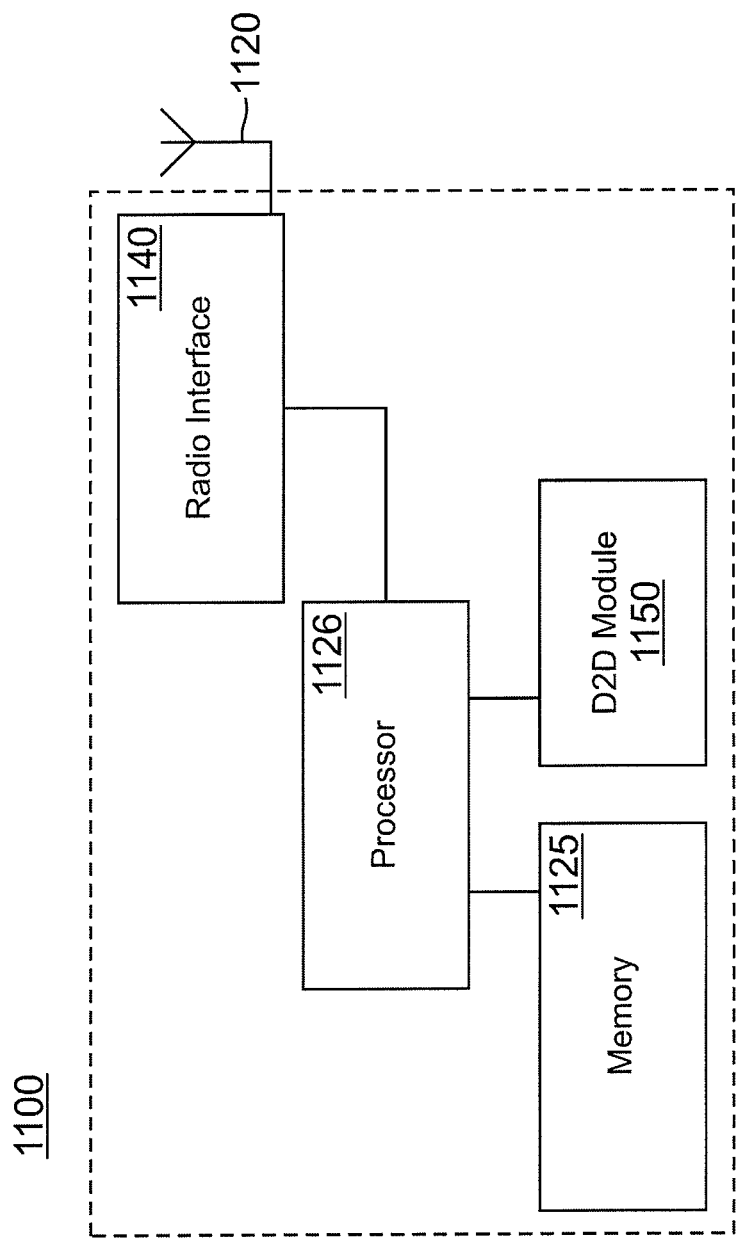
FIG. 11 depicts an example of a base station.

FIG. 11 depicts an example implementation of a base station 1100, which may be implemented at base stations 110A-B. The base station may include an antenna 1120 configured to transmit via downlinks, uplinks, and D2D links. The base station may further include a radio interface 1040 coupled to the antenna 1120, a processor 1126 for controlling the base station and for accessing and executing program code stored in memory 1135. The radio interface 1140 further includes other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station is also compatible with IEEE 802.16, LTE, LTE-Advanced, and the like, and the RF signals of downlinks and uplinks may be configured as an OFDMA signal. The base station may include a D2D module 1150. The D2D module 1150 may send, receive, and/or control aspects of the D2D mechanisms described herein with respect to the eNB, base station, and/or network.

The subject matter described herein may be embodied in systems, apparatus, methods, and/or articles depending on the desired configuration. For example, the base stations and user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. Moreover, although the above examples describe the ad hoc networks as a device-to-device pair of devices, the devices may be organized into a cluster of, for example, two or more devices. In addition, the logic flow depicted in the accompanying figures and/or described herein does not require the particular order shown, or sequential order, to achieve desirable results. Other embodiments may be within the scope of the following claims.

What is claimed:

1. A method comprising:
   sending, by a source base station, a handover request message to a target base station, the handover request message including a proposed common identifier for a device-to-device pair and a proposed allocation of radio resources for a device-to-device link for the device-to-device pair, the device-to-device pair including a first device and a second device, and the proposed common identifier identifying the device-to-device pair in each of a target cell of the target base station and a source cell of the source base station;

receiving, at the source base station, a handover request reply message from the target base station in response to the handover request message, the handover request reply message including a confirmation of the proposed allocation and of the proposed common identifier;

sending, by the source base station, a handover command to the first device, the handover command including the proposed allocation and the proposed common identifier;

receiving, at the source base station, a measurement report from the second device, the measurement report corresponding to measurements of the target base station; and determining, at the source base station, whether to initiate a handover of the second device to the target base station, wherein when the handover is initiated, the first device and the second device are both handed over to the target base station.

2. The method of claim 1, wherein the proposed common identifier is common to the target cell and the source cell.

3. The method of claim 1, wherein the device-to-device link is in the target cell of the target base station.

4. The method of claim 1, further comprising:
sending, by the second device to the target base station, a handover confirm message when the handover command is received from the source base station.

5. A method comprising:
sending, by a source base station and to a first device, a request to measure one or more aspects of at least one of a target base station and a target cell, when the source base station makes a first decision to handover a second device to the target base station and the target cell, wherein the first and second devices are a device-to-device pair and the first and second devices are controlled by the source base station;

sending, from the source base station and based on measurements received from the first device, a handover request message to the target base station, the handover request message indicating a decision to handover the first device to the target base station and the target cell, the handover request further indicating the second device, the handover request message including a proposed common identifier for the device-to-device pair and a proposed allocation of radio resources for the device-to-device pair, and the proposed common identifier identifying the device-to-device pair in each of the target cell and a source cell of the source base station; and initiating, in response to a reply to the handover request, a joint handover of the first and second devices to the target base station and the target cell.

6. The method of claim 5, wherein the joint handover is initiated after receiving, from the target base station, a handover request reply for the first and second devices.

7. The method of claim 5, further comprising:
receiving, at the source base station, the reply to the handover request, the reply comprising a common identifier for the device-to-device pair and an allocation of radio resources for a device-to-device link for the device-to-device pair.

8. A method comprising:
sending, by a source base station, a handover request message to a target base station, the handover request message including a proposed common identifier for a device-to-device pair and a proposed allocation of radio resources for the device-to-device pair, the device-to-device pair comprising a first device and a second device, wherein a handover is initiated by at least one of the first device and the second device, and wherein the proposed common identifier identifies the device-to-device pair in each of a target cell of the target base station and a source cell of the source base station;

receiving, at the source base station, a handover request reply message from the target base station in response to the handover request message, the handover request reply message including a confirmation of the proposed allocation and of the proposed common identifier; and sending, by a source base station, a joint handover command to the first device and the second device, the joint handover command including the proposed allocation and the proposed common identifier.

9. The method of claim 8, wherein the proposed common identifier is common to the target cell and the source cell, and wherein the proposed allocation comprises radio resources for a device-to-device link in a target cell of the target base station.

10. An apparatus comprising:
at least one processor; and
at least one memory, wherein the at least one processor and the at least one memory configured to cause the apparatus to at least:
send a handover request message to a target base station, the handover request message including a proposed common identifier for a device-to-device pair and a proposed allocation of radio resources for a device-to-device link for the device-to-device pair, the device-to-device pair including a first device and a second device, the apparatus comprising a source base station, and the proposed common identifier identifying the device-to-device pair in each of a target cell of the target base station and a source cell of the source base station;
receive a handover request reply message from the target base station in response to the handover request message, the handover request reply message including a confirmation of the proposed allocation and of the proposed common identifier;
send a handover command to the first device, the handover command including the proposed allocation and the proposed common identifier;
receive a measurement report from the second device, the measurement report corresponding to measurements of the target base station; and
determine whether to initiate a handover of the second device to the target base station, wherein when the handover is initiated, the first device and the second device are both handed over to the target base station.

11. An apparatus comprising:
at least one processor; and
at least one memory, wherein the at least one processor and the at least one memory configured to cause the apparatus to at least:
send, by a source base station and to a first device, a request to measure one or more aspects of at least one of a target base station and a target cell, when the source base station makes a first decision to handover a second device to the target base station and the target cell, wherein the first and second devices are a device-to-device pair and the first and second devices are controlled by the source base station;

send, from the source base station, a handover request message to the target base station, the handover request message to handover the first device to the target base station and the target cell based on measurements received from the first device, the handover request further indicating the second device, the handover request message including a proposed common identifier for the device-to-device pair and a proposed allocation of radio resources for the device-to-device pair, and the proposed common identifier identifying the device-to-device pair in each of the target cell and a source cell of the source base station; and initiate, in response to a reply to the handover request, a joint handover of the first and second devices to the target base station and the target cell.

12. An apparatus comprising:

at least one processor; and at least one memory, wherein the at least one processor and the at least one memory configured to cause the apparatus to at least:

send a handover request message to a target base station, the handover request message including a proposed common identifier for a device-to-device pair and a proposed allocation of radio resources for the device-to-device pair, the device-to-device pair comprising a first device and a second device, wherein a handover is initiated by at least one of the first device and the second device, wherein the apparatus comprises a source base station, and wherein the proposed common identifier identifies the device-to-device pair in each of a target cell of the target base station and a source cell of the source base station;

receive a handover request reply message from the target base station in response to the handover request message, the handover request reply message including a confirmation of the proposed allocation and of the proposed common identifier; and send a joint handover command to the first device and the second device, the joint handover command including the proposed allocation and the proposed common identifier.

13. A non-transitory computer-readable storage medium including code which when executed by a processor provide operations comprising:

at least one processor; and at least one memory, wherein the at least one processor and the at least one memory provide operations comprising:

sending, by a source base station, a handover request message to a target base station, the handover request message including a proposed common identifier for a device-to-device pair and a proposed allocation of radio resources for a device-to-device link for the device-to-device pair, the device-to-device pair including a first device and a second device, and the proposed common identifier identifying the device-to-device pair in each of a target cell of the target base station and a source cell of the source base station;

receiving, at the source base station, a handover request reply message from the target base station in response to the handover request message, the handover request reply message including a confirmation of the proposed allocation and of the proposed common identifier;

sending, by the source base station, a handover command to the first device, the handover command including the proposed allocation and the proposed common identifier;

receiving, at the source base station, a measurement report from the second device, the measurement report corresponding to measurements of the target base station; and determining, at the source base station, whether to initiate a handover of the second device to the target base station, wherein when the handover is initiated, the first device and the second device are both handed over to the target base station.

14. A non-transitory computer-readable storage medium including code which when executed by a processor provide operations comprising:

sending, by a source base station, a handover request message to a target base station, the handover request message including a proposed common identifier for a device-to-device pair and a proposed allocation of radio resources for the device-to-device pair, the device-to-device pair comprising a first device and a second device, wherein the proposed common identifier identifies the device-to-device pair in each of a target cell of the target base station and a source cell of the source base station, and wherein a handover is initiated by at least one of the first device and the second device;

receiving, at the source base station, a handover request reply message from the target base station in response to the handover request message, the handover request reply message including a confirmation of the proposed allocation and of the proposed common identifier; and sending, by the source base station, a joint handover command to the first device and the second device, the joint handover command including the proposed allocation and the proposed common identifier.

* * * * *